(12) United States Patent
Winch (10) Patent No.: US 6,729,609 B2
(45) Date of Patent: May 4, 2004

(54) CARBURETOR ARRANGEMENT

(75) Inventor: Michael D. Winch, Calgary (CA)

(73) Assignee: Telekinetic Inc., Calgary (CA)

( * ) Notice: Subject to any disclaimer, the term of this patent is extended or adjusted under 35 U.S.C. 154(b) by 41 days.

(21) Appl. No.: 10/222,846

(22) Filed: Aug. 19, 2002

(65) Prior Publication Data

US 2004/0032033 A1 Feb. 19, 2004

(51) Int. Cl.$^7$ ............................................. F02M 31/18
(52) U.S. Cl. ................. 261/152; 123/543; 261/DIG. 83
(58) Field of Search ................................. 261/152, 155, 261/127, DIG. 83; 123/543, 556–558

(56) References Cited

U.S. PATENT DOCUMENTS

| | | | | |
|---|---|---|---|---|
| 991,152 A | * | 5/1911 | Hanchett | 261/152 |
| 1,046,344 A | * | 12/1912 | Stewart | 261/152 |
| 1,140,064 A | * | 5/1915 | Rakestraw | 261/152 |
| 1,148,247 A | * | 7/1915 | Moore | 261/152 |
| 1,212,986 A | * | 1/1917 | Moore | 261/152 |
| 1,213,817 A | * | 1/1917 | Baruch | 261/152 |
| 1,216,043 A | * | 2/1917 | Ahlberg | 261/155 |
| 1,288,639 A | * | 12/1918 | Mauck | 261/155 |
| 1,347,052 A | * | 7/1920 | Ost | 261/155 |
| 1,356,117 A | * | 10/1920 | Ahlberg | 261/152 |
| 1,413,607 A | * | 4/1922 | Olsen | 261/155 |
| 1,567,268 A | * | 12/1925 | Holley | 261/155 |
| 1,703,914 A | * | 3/1929 | Whiteman | 261/152 |
| 1,740,221 A | * | 12/1929 | Moore | 261/152 |
| 1,757,833 A | * | 5/1930 | Haegler | 261/152 |
| 1,766,657 A | * | 6/1930 | Lampton | 261/155 |
| 1,798,161 A | * | 3/1931 | Kirby | 261/152 |
| 1,915,427 A | * | 6/1933 | Kowalewski | 261/155 |
| 2,061,043 A | * | 11/1936 | Philip | 261/152 |
| 2,073,649 A | * | 3/1937 | Price | 261/155 |
| 2,353,926 A | * | 7/1944 | Peters | 261/155 |
| 2,362,163 A | * | 11/1944 | Shipman | 261/155 |
| 2,742,886 A | * | 4/1956 | McPherson | 261/DIG. 83 |
| 3,116,988 A | * | 1/1964 | Lauder | 261/152 |
| 4,008,692 A | | 2/1977 | Shinohara et al. | 123/3 |
| 4,016,846 A | | 4/1977 | Nakano et al. | 123/286 |
| 4,018,199 A | | 4/1977 | Furucz | 123/547 |
| 4,136,139 A | | 1/1979 | Nakamura et al. | 261/67 X |
| 4,186,705 A | | 2/1980 | Abthoff et al. | 261/144 X |
| 4,323,043 A | | 4/1982 | Alderson | 123/557 |
| 4,336,773 A | | 6/1982 | Carouthers et al. | 123/25 B |
| 4,342,287 A | | 8/1982 | Concepcion | 123/572 X |

(List continued on next page.)

FOREIGN PATENT DOCUMENTS

JP    60-173353    *  9/1985 ................. 261/152

OTHER PUBLICATIONS www.mikuni.com/carbtech/products.htm 2 pages, Jul. 26, 2001.
www.mikuni.com/carbtech/hsrcarburetors02.htm 2 pages, Jul. 26, 2001.
www.sudco.com/images/exphsr42.gif 2 pages, Jul. 26, 2001.

*Primary Examiner*—Richard L. Chiesa
(74) *Attorney, Agent, or Firm*—Sean W. Goodwin (57) ABSTRACT

An improved carburetor arrangement includes a low-capacity fuel/air regulator for efficiently vaporizing rich mixtures of fuel and delivering them to a heat exchange vaporizer for heating and completely vaporizing the rich mixture prior to delivery to an engine intake. An existing conventional fuel atomization system is eliminated and replaced with main combustion air gallery. The air gallery forms a low pressure for drawing heated rich mixture from the vaporizer and subsequently mixing it with a larger amount of incoming fresh air from the gallery for forming a stoichiometric mixture. Preferably the mixture is passed through a mixing chamber before delivery to the engine intake. Preferably the fuel/air regulator is a low-capacity carburetor, such as that used for motorcycles, snowmobiles and the like.

12 Claims, 6 Drawing Sheets

U.S. PATENT DOCUMENTS

| | | | |
|---|---|---|---|
| 4,364,365 A | 12/1982 | Gendron | 123/557 |
| 4,469,077 A | 9/1984 | Wooldridge | 123/548 |
| 4,512,323 A | 4/1985 | Ruth et al. | 123/557 |
| 4,611,557 A | 9/1986 | Hierzenberger | 123/258 |
| 4,640,234 A | 2/1987 | Olsson et al. | 123/557 |
| 4,784,092 A | 11/1988 | Pitti | 123/525 |
| 5,140,966 A | 8/1992 | Wong | 123/543 |
| 5,775,308 A | 7/1998 | Headley | 123/549 |
| 5,782,225 A | 7/1998 | Caggiano | 123/545 |
| 6,155,239 A | 12/2000 | Dykstra | 123/522 |

* cited by examiner

CARBURETOR ARRANGEMENT

FIELD OF THE INVENTION

The present invention relates to an arrangement incorporating a carburetor discharging a rich fuel mixture to a heat exchange vaporizer prior to mixing with main combustion air for fueling an engine. More particularly, the vaporizer utilizes waste heat from the exhaust of the engine.

BACKGROUND OF THE INVENTION

It is known that gasoline-type internal combustion engines consume a significant amount of gas and produce noxious emissions. Such engines typically utilize a conventional carburetor or fuel injection systems. Such systems require a liquid fuel which is atomized and mixed with air to render it suitable for combustion. Carbureted or injected systems further dictate the proportions of gasoline and air required for varying engine operation. Such systems provide the desired amount of gasoline and air for conditions including normal driving, acceleration, hill climbing and sustaining speeds.

Successful and complete vaporization of the liquid fuel has been a goal sought by many. Incomplete vaporization result in raw liquid being ingested into the engine's combustion chamber resulting in poor efficiency and pollution. This situation is further exacerbated in low operations such as under low engine speed where air flow is low and energy to vaporize fuel is lowest. Fuel injection has gone a long way to maximize atomization, however there has been little relief for the large number of carbureted vehicles still in service.

In the group of carbureted fuel delivery systems, there have been attempts to maximize vaporization through means other than mere atomization and mixing with the stream of combustion air. Such technology includes that disclosed in U.S. Pat. No. 4,469,077 to Wooldridge illustrates a carburetor in which the entire fuel and air mixture is sent through an exhaust gas heat exchanger prior to reaching the engine rich mixture intake. The carburetor is conventional with only the resulting mixture being piped from the carburetor, to the heat exchanger adjacent the exhaust and back to the intake engine.

Further, in U.S. Pat. No. 5,140,966 to Wong, fuel enters a reservoir upon which an ultrasonic plate vaporizes the fuel and a fan blows a small amount of air and the fuel vapor through a heat exchanger heated by exhaust gas. The resulting heated fuel and air is finally commingled with a main air steam before reaching the engine's intake. Both ultrasonic agitation and heat are used to improve fuel vaporization and are located remote from the engine intake.

Prior art systems are characterized by independent, large and expensive systems for adapting existing carburetors or replacing carburetors.

There is a demonstrated need for a carburetor which is capable of substantially complete vaporization of the liquid fuel and resulting in even distribution between engine cylinders so as to completely burn the fuel mixture, reduce emissions and reduce liquid fuel consumption.

SUMMARY OF THE INVENTION

An improved carburetor arrangement is provided which improves gas mileage and decreases exhaust emissions. The arrangement is suitable for fitting to substantially any gasoline-burning engine. The arrangement vaporizes substantially all elements in the fuel, and then forming a nearly perfect mix of vapor and air resulting in a balanced distribution to each combustion chamber of the engine. In a preferred arrangement, the vaporizer, the mixing chamber and heat control are all assembled into one unit, fit directly to the intake manifold. As a result, gas mileage is improved, oil stays cleaner longer, engine runs cooler, and fuel emissions are almost nil. As a result of the cooler running engine and cleaner oil the wear and tear on the engine is less and the life of the engine should be longer.

The carburetor arrangement comprises a heat exchanger or vaporizer which conditions the fuel to produce the maximum allowable power and a minimum amount of emissions. One disadvantage in the prior art, as pointed out by Wooldridge, is that conventional carburetors are inefficient at lower fuel demands; lower fuel demand being exactly the objective when reducing gas consumption in a stock power train. The present arrangement uses a low-capacity fuel/air regulator or carburetor for efficiently vaporizing rich mixtures of fuel and subsequently later mixing the rich mixture with more air to obtain stoichiometric amounts for combustion. The rich mixture is fed into the vaporizer to allow this small amount of air and fuel to be heated and completely vaporized. Simply, the low-capacity carburetor allows this efficiently mixed, rich vapor to be heated for subsequent mixing with a larger amount of incoming fresh combustion air, at a regulated amount, and which is then which distributed. The main air and rich mixture preferably pass through a mixing chamber before the engine intake. Further, the carburetor arrangement is conveniently and simply contained in one sealed annular unit which connects to the engine intake at the conventional intake manifold.

In a broad aspect of the invention, a carburetor arrangement is provided for admitting fuel and stoichiometric amounts of air to an engine having an engine fuel mixture intake having a throttle regulator and discharging hot exhaust gas, the carburetor arrangement comprising: a main combustion air gallery connected to the engine intake having a main air regulator for admitting a substantially stoichiometric amount of air; a vaporizer having an exhaust gas passage therethrough connected to the engine's exhaust gas, and a fuel passage therethrough and having a fuel intake and a rich mixture discharge into the main combustion air gallery, the exhaust and fuel passages being isolated by a heat exchange barrier; and a fuel/air regulator connected to the fuel intake, the fuel/air regulator metering fuel and a carrier air into the fuel passage, the amounts of carrier air being less than a stoichiometric amount and only enough to carry the fuel through the fuel passage to the main air gallery.

Preferably the fuel/air regulator is a low-capacity carburetor, such as that used for motorcycles and snowmobiles.

DETAILED DESCRIPTION OF THE PREFERRED EMBODIMENT

Figure 1:
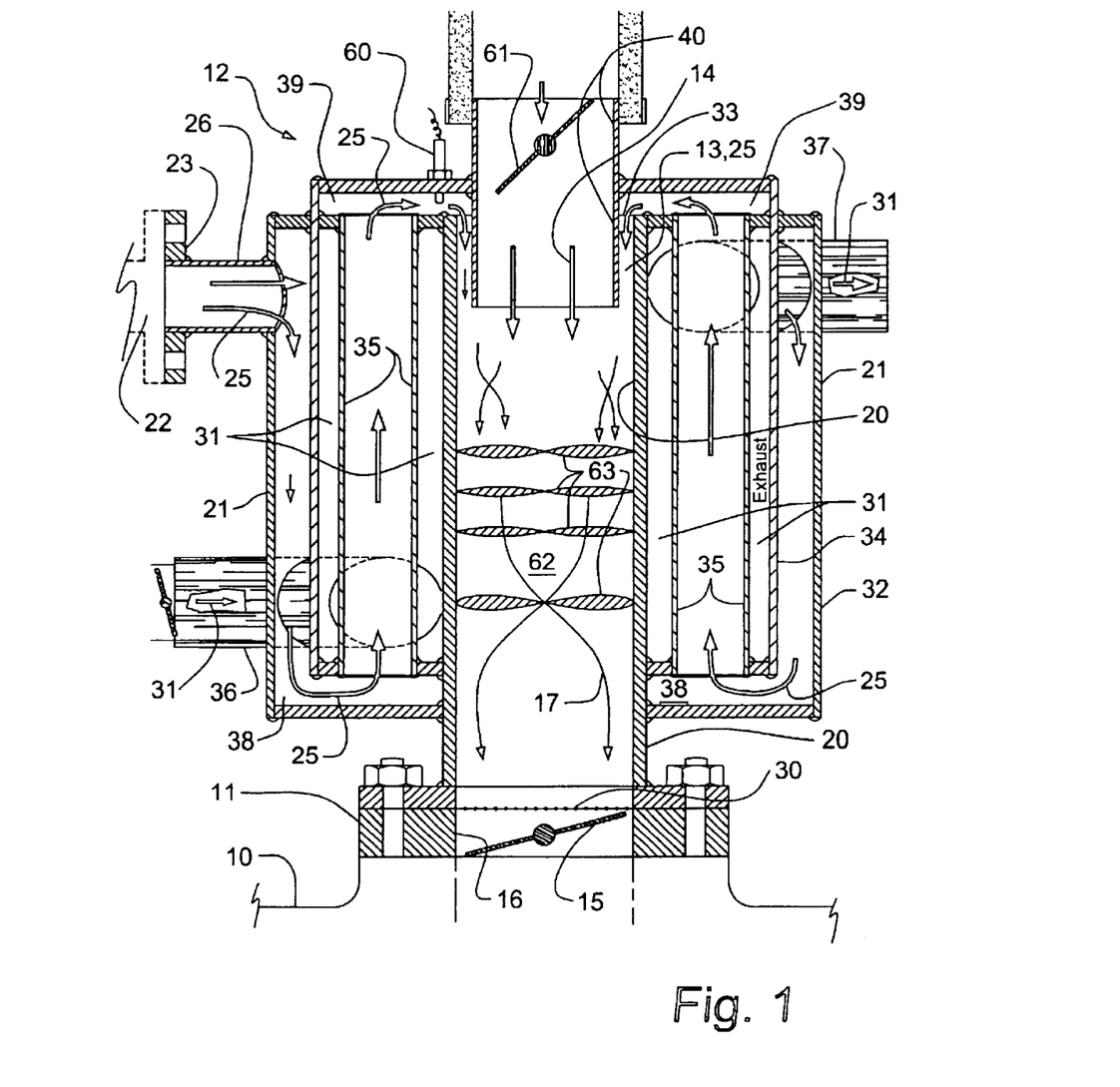
FIG. 1 illustrates a side cross-sectional view of one embodiment of the present invention.

With reference to FIG. 1, an engine 10 has an intake 11 which is fit with one embodiment of a carburetor arrangement 12. A flow of a hot vaporized fuel 13 and stoichiometric air 14 is regulated as a mixture 17 through an intake throttle regulator 15 and throttle body 16. The throttle regulator 15 is illustrated in a partially-throttled orientation.

Figure 3:
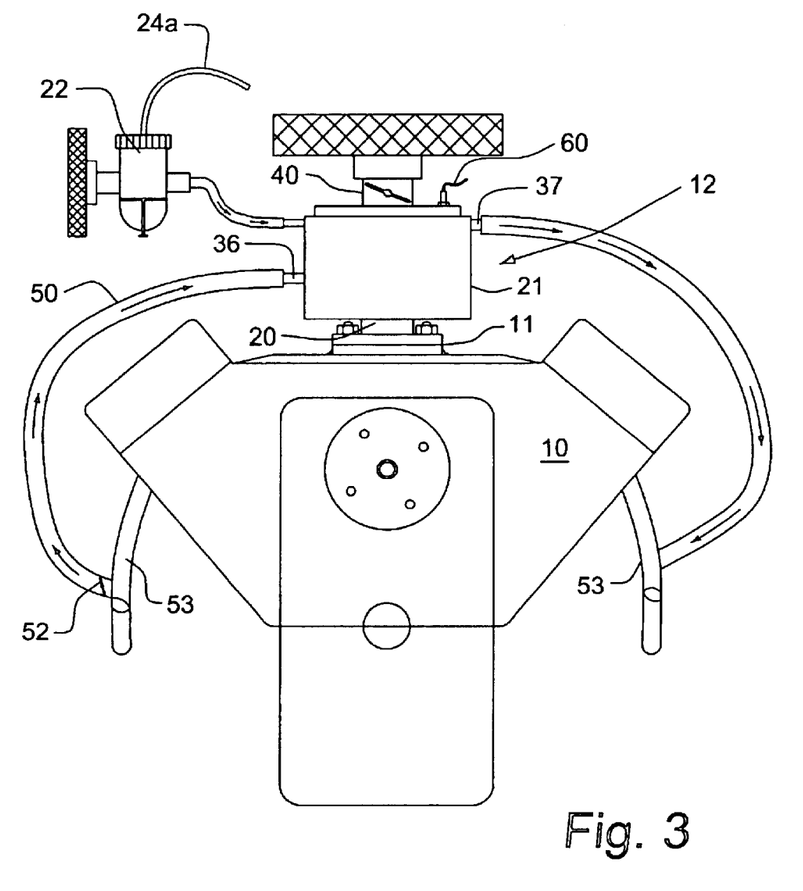
FIG. 3 illustrates a side view of an embodiment of the present invention adapted to a V-8 gasoline-fueled internal combustion engine.
Figure 4:
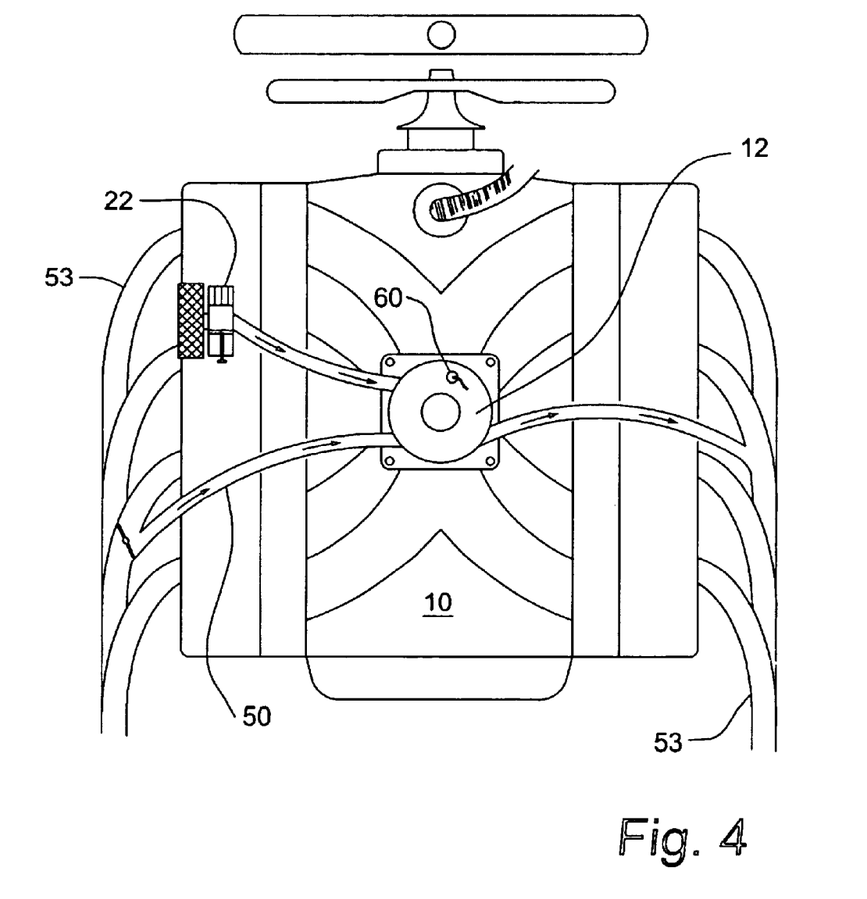
FIG. 4 illustrates a plan view of the arrangement of FIG. 3.

The stoichiometric fuel/air mixture 17 to the engine intake 11 is a result of the action of the novel carburetor arrangement 12 which comprises a main combustion air gallery 20 connected to the engine intake 11; a heat exchanger or vaporizer 21; and a fuel/air regulator 22 (best seen in FIGS. 3 and 4 connected through a flange to the vaporizer.

The fuel/air regulator is a conventional low-capacity carburetor for precise control and metering of a rich mixture of fuel 24a and a carrier air 24b as a rich mixture 25 through a fuel passage 26 into the vaporizer 21. The amounts of carrier air 24b admitted through the fuel/air regulator 22 are less than a stoichiometric amount normally required for operation of the engine 10, relying instead upon on commingling with a majority of main combustion air 14 being admitted through the main air gallery 20. Commingled air from the main air gallery 14v and the carrier air supply 24b stoichiometric amounts of air for the operation of the engine 10.

The carrier air 24b from the fuel/air regulator 22 is sufficient to carry the rich fuel mixture 25 through the fuel passage 26. The engine intake 11 is provided with a 300-micron stainless steel screen 30 as a precautionary measure for arresting and flame or flareback.

Figure 2:
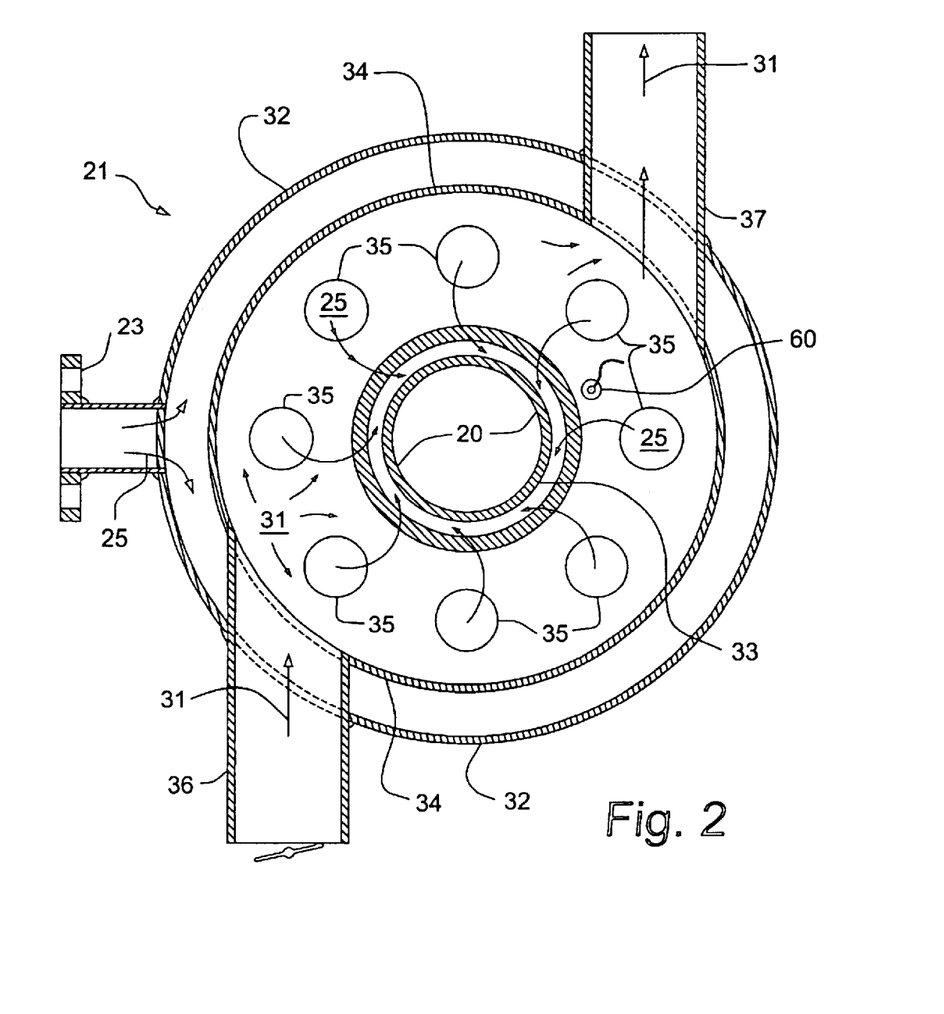
FIG. 2 illustrates a plan cross-sectional view of the arrangement according to FIG. 1.

With reference to FIGS. 1 and 2, the vaporizer 21 is a heat exchanger that enables transfer of heat from hot engine exhaust gases 31 to the cooler rich fuel mixture 25. One embodiment of the vaporizer 21 comprises an annular fuel chamber 32 fit about the main air gallery 20 (See also FIG. 6a). Another embodiment finds the vaporizer 21 located adjacent yet separate from the main air gallery 20 (See FIG. 6b). The fuel chamber 32 has an inlet flange 23 for connection to the fuel/air regulator 22 for forming the rich fuel mixture 25 which flows into the fuel chamber 32. The fuel chamber 32 also has an exit 33, preferably annular, into the main air gallery 20.

Within the fuel chamber 32, and also preferably formed about the main air gallery 20, is formed an independent hot exhaust chamber 34 for giving up heat to the fuel chamber 32, yet remaining sealed therefrom. The exhaust chamber 34 is provided with a plurality of parallel fuel tubes 35 passing independently therethrough and spaced circumferentially about the gallery 20. Hot exhaust gas 31 enters the exhaust chamber 34 at a tangential exhaust inlet 36 and circulates about the fuel tubes 35, exiting at a tangential and opposing exhaust exit 37 for return to the engine 10. The orientation of the exhaust inlet and exit 36,37 can vary, however with the objective to maximize contact of hot exhaust gas 31 and the surface area provided by the fuel tubes 35. The fuel tubes 35 are open to the fuel chamber 32 at a feed head 38 to admit the cool rich fuel mixture 25 and are open at a discharge head 39 to collect a hot rich fuel mixture 13 from each tube 35.

As illustrated in both FIGS. 1 and 2, the flow of rich fuel mixture 25 is preferably directed in through the fuel passage 26 to the fuel chamber 32, around and down an outside annulus between the fuel and exhaust chambers 32,24 to the bottom of the fuel chamber 32 for distribution to each of the fuel tubes 35. The rich fuel mixture 25 is then directed up the fuel tubes 35 for receiving conductive heat from the hot exhaust gases 31. The discharge head 39 collects and directs the vaporized fuel 13 through the annular exit into the main air gallery 20. This particular arrangement, having the hot rich fuel mixture 13 exiting adjacent the top of the vaporizer 21 aids in minimizing the height of main air gallery 20 and the carburetor arrangement 12 overall.

A main air sleeve 40 projects substantially concentrically into the main air gallery 20. As the sleeve 40 is smaller in diameter than the main air gallery, the fuel chamber's annular exit 33 is formed for admitting hot vaporized fuel mixture 13 from the fuel chamber 21 and into the gallery 20. The flow of the majority of the air 14 through the sleeve 40 and into main air gallery 20 forms a low pressure at the annular exit 33, inducing and drawing the vaporized and hot rich fuel mixture 13 into the main air gallery. Other means for forming a draft or suction are possible as illustrated with a venturi arrangement shown in FIG. 7c.

Figures 5, 6A, 6B:
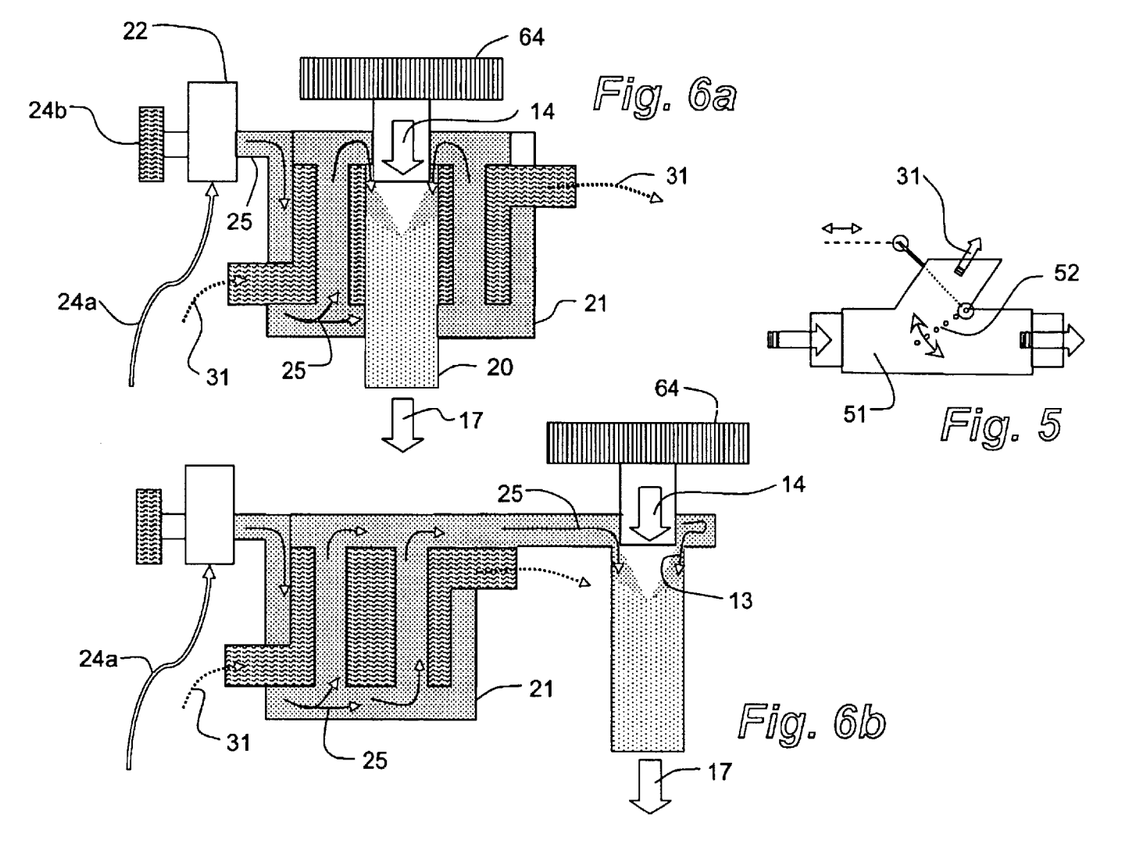
FIG. 5 is a side cross sectional view of an exhaust diverter for intercepting exhaust gas and directing.
FIGS. 6a and 6b are schematic diagrams of two embodiments of the invention wherein the heat exchanger is concentric about the main air gallery and remote therefrom respectively.

As shown in FIGS. 3–5, a hot exhaust pipe 50 from the engine 10 is connected to the exhaust chamber 34. Means such as a "Y" junction 51 and diverter gate 52 (FIG. 5) control the flow of hot exhaust gases 31. The diverter gate 52 is operable between a heating position (down in FIG. 5) where at least a portion of the hot exhaust 31 is diverted to the vaporizer 21, and a bypassing position (up) where most exhaust gas 31 bypasses the vaporizer 31. In the heating position, hot exhaust gas 31 circulates through the exhaust chamber 34 and around the tubes 35 for heating and vaporizing any rich fuel mixture 25 passing therethrough. Preferably, a substantially co-current heat exchange between hot exhaust gas 31 is formed through a flow of cool rich fuel mixture 25 up the inside of the tubes 35 and hot exhaust gas 31 up the outside of the tubes 35.

With reference to FIGS. 3 and 4, the vaporizer 21 is adapted for connection to one or more exhaust manifolds 53 of the engine 10. The amount of heat to the vaporizer 21 is controlled by the diverter gate 52 mounted in the exhaust pipe 50. Ideally, the vaporized fuel mixture 25 is raised to a temperature of about 250° F. as measured at a probe 60 in the discharge head 39 as it leaves as hot vapor 13 at the top of the fuel tubes 35. The vaporized fuel mixture 13 is then aspirated through the annular exit 33 and is mixed with warm, filtered main combustion air 14 to form a stoichiometric fuel mixture 17. The amount of fresh air being mixed with the hot vapor is controlled by a feed butterfly valve 61 mounted inside sleeve 40. The stoichiometric fuel mixture 17 is directed through a mixing chamber 62 comprising multi-directional blades or vanes 63 to further mix the fuel mixture 17 before reaching the engine intake.

A majority of the air required for operation of the engine 10 enters the engine as fresh main combustion air 14 directly into the main air gallery 20. A conventional air filter 64 is fit to the sleeve 40. The feed butterfly 61 in the sleeve 40 provides a gross level of control for regulating the quantity of main combustion air 14 in proportion to the rich mixture 25 regulated by the fuel/air regulator 22. The throttle regulator 15 at the engine intake 11 is controlled through a connection to the gas pedal (not shown). The throttle regulator 15 is coordinated with the fuel/air regulator 22 to vary engine output.

Figure 7A:
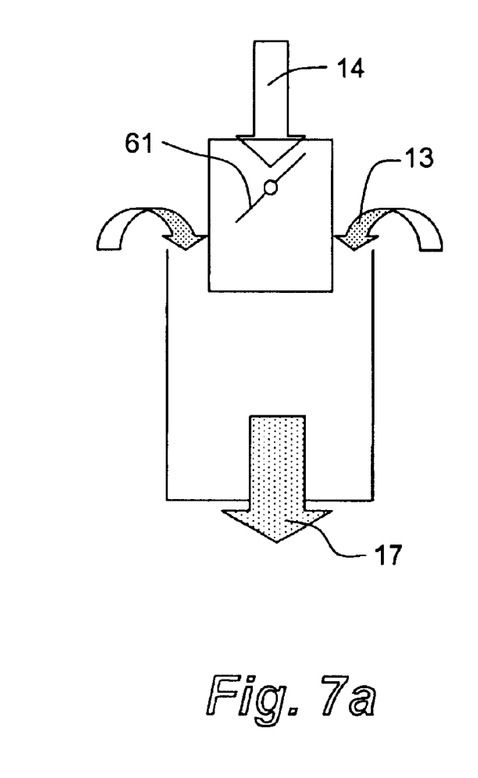
FIGS. 7a–7c are various embodiments of the throttle and rich fuel mixture exit to main air gallery.
Figure 7B:
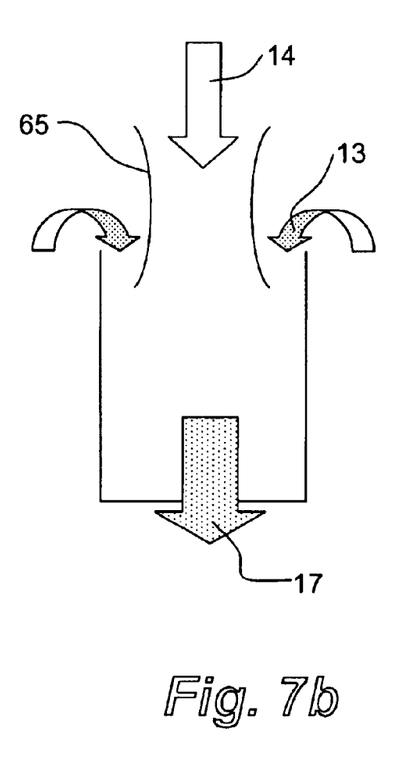
Figure 7C:
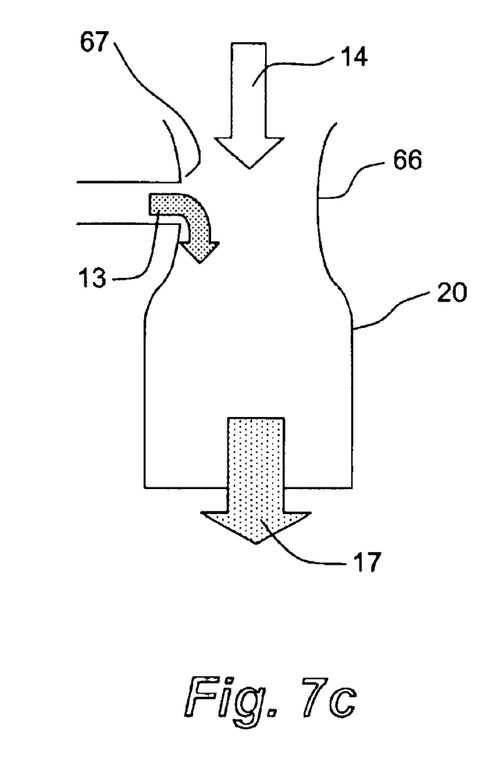

Various other embodiments of the control of main air 14 and rich fuel mixture 13 are illustrated in FIGS. 7a–7c.

As described above, the feed butterfly 61 grossly controls the main air proportions through the sleeve. In FIG. 7*b*, the sleeve 40 may simply comprise a self regulating venturi, without a butterfly. In FIG. 7*c*, a venturi 66 can be formed at an inlet to the main air gallery 20, the venturi having a throat 67 so that the resulting venturi effect may be combined for both proportioning of the air 14 and for creating the low pressure used for drawing the rich fuel mixture 13 into the main air gallery 20.

Typically the vaporizer 21 is fitted with a small low-capacity fuel/air regulator 22 such as a Mikuni™ carburetor available from Mikuni American Corporation of Northridge, Calif. Such a carburetor is typically implemented for use with motorcycles and snowmobiles, and normally not to larger automobiles and the like, including a Mikuni HSR42/45 series carburetor. As stated, the carburetor provides a rich fuel mixture 25 to the vaporizer 21 for heating by the exhaust gases 31. The amount of carrier air 24*b* in the fuel mixture 25 is non-stoichiometric, that is, the Mikuni™ carburetor does not provide enough carrier air 24*b* to provide efficient or complete combustion in the engine 10. The main air gallery 20 provides the greatest amount of air 14. The butterfly 61 on the main air gallery regulates the mixture of main air 14 to supplement the rich fuel mixture 25,13 provided by the Mikuni.

In an example a Mikuni™ carburetor was fit to a 350 cu.in. V-8 engine in a pre-1990 ½ ton Chevrolet™ truck. The truck had a conventional fuel consumption of 14 miles per gallon (mpg) prior to installation of the current invention. Afterwards, the performance was increased to 72 mpg.

The Embodiments for which an exclusive property or privilege is claimed are defined as follows:

1. A carburetor arrangement for admitting vaporized fuel and stoichiometric amounts of air to an engine, the engine having an engine intake, the arrangement comprising:
    a main air gallery connected to the engine intake for admitting a majority of air therethrough for operation of the engine;
    a fuel chamber in heat communication with an exhaust chamber through which hot exhaust gas passes for forming a heat exchanger;
    a vapor exit formed between an exit from the fuel chamber and a low pressure zone in the main air gallery;
    a fuel/air regulator for metering fuel and carrier air as a rich fuel mixture into an inlet to the fuel chamber, the rich fuel mixture being heated through the fuel chamber for producing a hot vaporized fuel mixture at the vapor exit wherein, when the hot vaporized fuel mixture is combined with the majority of air through the main air gallery, a substantially stoichiometric amount of air is admitted to the engine; and
    a sleeve extending into the main air gallery and forming an annulus which forms the exit of the fuel chamber so that a flow of air through the sleeve forms a low pressure zone so that hot vaporized fuel mixture is drawn into the main air gallery.

2. The carburetor arrangement of claim 1, wherein the sleeve is a venturi.

3. The carburetor arrangement of claim 1 wherein a venturi is formed at an intake to the main air gallery and has a throat, the throat forming a low pressure zone and being in fluid communication with the exit of the fuel chamber so that hot vaporized fuel mixture is drawn into the main air gallery.

4. The carburetor arrangement of claim 1 wherein the exit of the fuel chamber is formed as an annular exit about the main air gallery, further comprising:
    a sleeve extending into the main air gallery and forming an annulus therearound which is in fluid communication with annular exit of the fuel chamber so that hot vaporized fuel mixture is drawn into the main air gallery.

5. The carburetor arrangement of claim 4 wherein the heat exchanger further comprises a plurality of fuel tubes extending from the fuel chamber and through the exhaust chamber for conducting and heating rich fuel mixture from the inlet to exit of the fuel chamber.

6. The carburetor arrangement of claim 1 wherein the heat exchanger further comprises a plurality of fuel tubes extending from the fuel chamber and through the exhaust chamber for conducting and heating rich fuel mixture from the inlet to exit of the fuel chamber.

7. The carburetor arrangement of claim 6 wherein the fuel/air regulator is a carburetor.

8. The carburetor arrangement of claim 1 further comprising a means for diverting at least a portion of hot exhaust gas from the engine and to the heat exchanger wherein the diverting means comprises:
    a "Y" junction located in the engine's exhaust; and
    a gate movable between a heat exchanger heating and a bypassing position.

9. A carburetor arrangement for admitting vaporized fuel and stoichiometric amounts of air to an engine, the engine having an engine intake, the arrangement comprising:
    a main air gallery connected to the engine intake for admitting a majority of air therethrough for operation of the engine;
    a sleeve extending into the main air gallery and forming an annulus therebetween;
    a fuel chamber in heat communication with an exhaust chamber through which hot exhaust gas passes for forming a heat exchanger, the fuel chamber and exhaust chamber being formed about the main air gallery;
    a vapor exit formed between an exit from the fuel chamber and at the annulus between the sleeve and the main air gallery so that a flow of air through the sleeve forms a low pressure zone so that hot vaporized fuel mixture is drawn into the main air gallery; and
    a fuel/air regulator for metering fuel and carrier air as a rich fuel mixture into an inlet to the fuel chamber, the rich fuel mixture being heated through the fuel chamber for producing a hot vaporized fuel mixture at the vapor exit wherein, when the hot vaporized fuel mixture is combined with the majority of air through the main air gallery, a substantially stoichiometric amount of air is admitted to the engine.

10. The carburetor arrangement of claim 9 wherein the heat exchanger further comprises a plurality of fuel tubes extending from the fuel chamber and through the exhaust chamber for conducting and heating rich fuel mixture from the inlet to exit of the fuel chamber.

11. The carburetor arrangement of claim 10 wherein the fuel/air regulator is a carburetor.

12. A method for admitting vaporized fuel and stoichiometric amounts of air to an engine, the engine having an engine intake, the arrangement comprising the steps of:

metering fuel and carrier air into a fuel chamber in heat communication with an exhaust chamber through which hot exhaust gas passes for producing a hot vaporized fuel mixture;

admitting a majority of air therethrough for operation of the engine through a sleeve extending into a main air gallery, the sleeve forming an annulus therebetween;

drawing the hot vaporized fuel mixture through the annulus in an low pressure zone formed by the flow of the majority of the air through the sleeve and into the main air gallery at the annulus; and combining the hot vaporized fuel mixture and with the majority of air in the main air gallery for forming a substantially stoichiometric amount of air and vaporized fuel being admitted to the engine intake.

* * * * *